(12) United States Patent
Zhang et al.

(10) Patent No.: US 8,565,146 B2
(45) Date of Patent: Oct. 22, 2013

(54) METHOD AND APPARATUS FOR SUPPORTING DATA TRANSMISSION IN A MULTI-CARRIER COMMUNICATION SYSTEM

(75) Inventors: Danlu Zhang, San Diego, CA (US); Mehmet Yavuz, San Diego, CA (US); Bibhu P. Mohanty, San Diego, CA (US); Pavan Kumar Vitthaladevuni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 630 days.

(21) Appl. No.: 12/393,529

(22) Filed: Feb. 26, 2009

(65) Prior Publication Data

US 2009/0213805 A1 Aug. 27, 2009

Related U.S. Application Data

(60) Provisional application No. 61/031,941, filed on Feb. 27, 2008.

(51) Int. Cl.
*H04B 7/185* (2006.01)
*H04B 7/00* (2006.01)

(52) U.S. Cl.
USPC .......................................... 370/318; 455/522

(58) Field of Classification Search
None
See application file for complete search history.

(56) References Cited

U.S. PATENT DOCUMENTS

| | | | |
|---|---|---|---|
| 6,751,444 B1 | 6/2004 | Meiyappan | |
| 7,349,436 B2 | 3/2008 | Maltsev et al. | |
| 7,570,953 B2 * | 8/2009 | Maltsev et al. | 455/450 |
| 2003/0016123 A1 * | 1/2003 | Tager et al. | 340/310.01 |
| 2004/0009783 A1 | 1/2004 | Miyoshi | |
| 2004/0048619 A1 * | 3/2004 | Kim et al. | 455/452.1 |
| 2004/0109424 A1 | 6/2004 | Chheda | |
| 2005/0007807 A1 | 1/2005 | Martin et al. | |

(Continued)

FOREIGN PATENT DOCUMENTS

| | | |
|---|---|---|
| CN | 1346218 A | 4/2002 |
| JP | 2003032218 | 1/2003 |

(Continued)

OTHER PUBLICATIONS

International Search Report and Written Opinion—PCT/US2009/035587, International Searching Authority—European Patent Office, Nov. 27, 2009.

(Continued)

*Primary Examiner* — Eunsook Choi
(74) *Attorney, Agent, or Firm* — Charles Chesney

(57) ABSTRACT

Techniques for supporting data transmission on multiple carriers in a wireless communication system are described. A user equipment (UE) may determine available transmit power for data transmission on multiple carriers. The UE may distribute the available transmit power to multiple carriers (e.g., using uniform power distribution, greedy filling, water filling, etc.) to obtain allocated transmit power for data for each carrier. The UE may send at least one resource request with information indicative of the allocated transmit power for each of the multiple carriers to a Node B. The UE may receive at least one resource grant with information indicative of granted transmit power for each of at least one carrier, which may be all or a subset of the multiple carriers. The UE may send data on the at least one carrier and may limit its transmit power for each carrier to the granted transmit power for that carrier.

41 Claims, 7 Drawing Sheets

(56) References Cited

U.S. PATENT DOCUMENTS

| | | | |
|---|---|---|---|
| 2005/0032514 A1* | 2/2005 | Sadri et al. | 455/423 |
| 2005/0136840 A1* | 6/2005 | Molnar et al. | 455/63.1 |
| 2005/0152466 A1* | 7/2005 | Maltsev et al. | 375/260 |
| 2006/0030364 A1* | 2/2006 | Olesen et al. | 455/562.1 |
| 2006/0126749 A1* | 6/2006 | Armour et al. | 375/260 |
| 2007/0070908 A1 | 3/2007 | Ghosh et al. | |
| 2007/0091988 A1 | 4/2007 | Sadri et al. | |
| 2007/0099668 A1 | 5/2007 | Sadri et al. | |
| 2007/0104087 A1* | 5/2007 | Tee et al. | 370/208 |
| 2007/0168326 A1 | 7/2007 | Das et al. | |
| 2007/0201344 A1 | 8/2007 | Miyabayashi | |
| 2008/0187060 A1* | 8/2008 | Park et al. | 375/260 |
| 2008/0207150 A1* | 8/2008 | Malladi et al. | 455/127.1 |
| 2009/0030364 A1 | 1/2009 | Harmon et al. | |
| 2009/0176525 A1* | 7/2009 | Wang et al. | 455/522 |

FOREIGN PATENT DOCUMENTS

| | | |
|---|---|---|
| JP | 2007201810 A | 8/2007 |
| RU | 2006108531 A | 7/2006 |
| WO | WO02103926 | 12/2002 |
| WO | 2005018125 A1 | 2/2005 |
| WO | 2006019287 A1 | 2/2006 |
| WO | 2006131793 A2 | 12/2006 |
| WO | 07038729 | 4/2007 |
| WO | 2007075744 | 7/2007 |

OTHER PUBLICATIONS

Song, et al: "Multi-user subcarrier allocation with minimum rate requests for downlink OFDM packet transmission," Vehicular Technology Conference 2004-SPRING. 2004 IEEE 59TH Milan, Italy May 17-19, 2004, Piscataway, NJ, USA, IEEE, US, vol. 4, May 17, 2004, pp. 1920-1924, XP010766496, p. 1920—left-hand column.

Taiwan Search Report—TW098106593—TIPO—Mar. 16, 2012.

Ohtani Y., et al., "A Low-Complexity Algorithm for Subcarrier Allocation in Multi-User OFDM Systems," Technical Report of the Institute of Electronics, Information and Communication Engineers, Mar. 8, 2005, vol. 104, No. 717, pp. 103-108, CS2004-251.

Alcatel-Lucent, "Impact of Uplink Inter-cell Interference Coordination on Uplink Power Control", 3GPP R1-072921, 3GPP TSG RAN WG1 #49bis Meeting, pp. 1-7, Jun. 29, 2007.

\* cited by examiner

METHOD AND APPARATUS FOR SUPPORTING DATA TRANSMISSION IN A MULTI-CARRIER COMMUNICATION SYSTEM

The present application claims priority to provisional U.S. Application Ser. No. 61/031,941, entitled "METHOD AND APPARATUS FOR MULTI-CARRIER COMMUNICATIONS IN WIRELESS COMMUNICATIONS," filed Feb. 27, 2008, assigned to the assignee hereof and incorporated herein by reference.

BACKGROUND

I. Field

The present disclosure relates generally to communication, and more specifically to techniques for supporting data transmission in a multi-carrier communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may support operation on multiple carriers in order to increase system capacity. Each carrier may have a specific center frequency and a specific bandwidth and may be used to send traffic data, control information, pilot, etc. Different carriers may observe different channel conditions and may have different transmission capacities. It is desirable to support data transmission on the multiple carriers such that good performance can be achieved.

SUMMARY

Techniques for supporting data transmission on multiple carriers in a wireless communication system are described herein. In one design, a user equipment (UE) may determine available transmit power for data transmission on multiple carriers. The UE may distribute the available transmit power to the multiple carriers (e.g., using uniform power distribution, greedy filling, water filling, etc.) to obtain allocated transmit power for data for each carrier. The UE may send at least one resource request comprising information indicative of the allocated transmit power for each of the multiple carriers to a Node B. The UE may send one resource request for each carrier or may send a resource request for more than one carrier. The UE may receive at least one resource grant comprising information indicative of granted transmit power for each of at least one carrier, which may be all or a subset of the multiple carriers. The UE may send data on the at least one carrier and may limit its transmit power on each carrier to the granted transmit power for that carrier.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced are new releases of UMTS that use E-UTRA. UTRA, E-UTRA, UMTS, LTE, LTE-Advanced and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for WCDMA, and 3GPP terminology is used in much of the description below.

Figure 1:
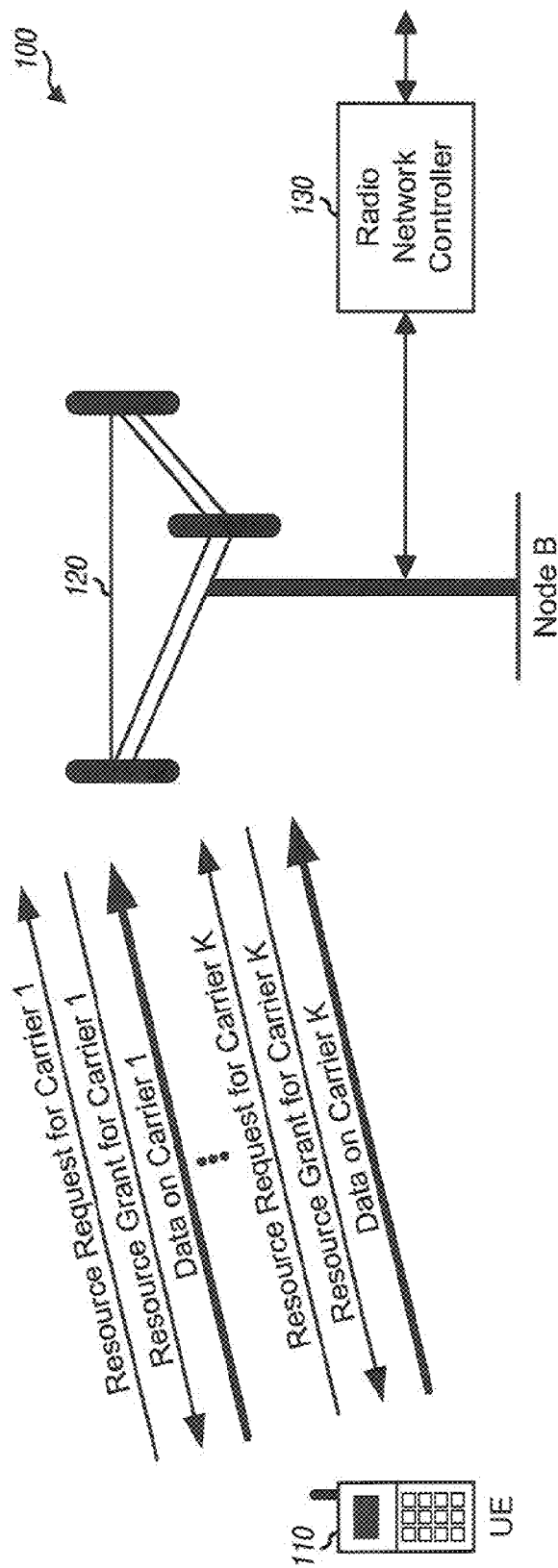
FIG. 1 shows a wireless communication system.

FIG. 1 shows a wireless communication system 100, which may include a number of Node Bs and other network entities. For simplicity, only one Node B 120 and one Radio Network Controller (RNC) 130 is shown in FIG. 1. A Node B may be a station that communicates with the UEs and may also be referred to as an evolved Node B (eNB), a base station, an access point, etc. A Node B may provide communication coverage for a particular geographic area. To improve system capacity, the overall coverage area of a Node B may be partitioned into multiple (e.g., three) smaller areas. Each smaller area may be served by a respective Node B subsystem. In 3GPP, the term "cell" can refer to the smallest coverage area of a Node B and/or a Node B subsystem serving this coverage area. RNC 130 may couple to a set of Node Bs and provide coordination and control for these Node Bs.

A UE 110 may be one of many UEs dispersed throughout the system. UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc. UE 110 may communicate with Node B 120 via the downlink and uplink. The downlink (or forward link) refers to the communication link from Node B 120 to UE 110, and the uplink (or reverse link) refers to the communication link from UE 110 to Node B 120.

The system may support data transmission on multiple (K) carriers on the uplink. One or more UEs may be scheduled for uplink data transmission on each carrier at any given moment. A given UE may be scheduled for uplink data transmission on up to K carriers at any given moment, depending on various factors such as the available system resources, the amount of traffic data to send by the UE, the priority of the UE, quality-of-service (QoS) requirements of the UE, etc.

FIG. 1 shows an example of data transmission on multiple carriers on the uplink. UE 110 may have traffic data to send and may send a resource request for each carrier. A resource request may also be referred to as an uplink request, a scheduling request, a scheduling information message, etc. The resource request for each carrier may convey a power headroom and/or other information that may be used to schedule the UE for data transmission on the carrier. The power headroom for a carrier may indicate the amount of transmit power that can be used for the carrier and may be given by a traffic-to-pilot ratio (T2P). The power headroom may also be referred to as a power offset, etc.

Node B 120 may receive the resource requests for all K carriers from UE 110 and may grant or deny the resource request for each carrier. Node B 120 may send a resource grant for each carrier for which the resource request is granted. A resource grant may also be referred to as a resource assignment, an absolute grant, an uplink grant, etc. The resource grant for each carrier may convey a granted T2P, a selected transport format, etc. A transport format may be associated with a specific coding scheme and/or code rate, a specific modulation scheme, a specific transport block size, etc. A transport format may also be referred to as a rate, a data rate, a packet format, a modulation and coding scheme (MCS), etc. UE 110 may send traffic data on each carrier in accordance with the resource grant for that carrier.

Node B 120 may implement a joint scheduler or a distributed scheduler for the uplink. A joint scheduler may receive resource requests for all K carriers from all UEs, perform scheduling for all K carriers jointly based on all received resource requests, and grant resources for each carrier such that good overall performance can be achieved. The granted resources may be given by granted T2Ps, data rates, etc. A distributed scheduler may receive resource requests for each carrier from all UEs, perform scheduling for each carrier independently, and grant resources for each carrier based on the resource requests received for that carrier.

UE 110 may send a separate resource request for each carrier if Node B 120 implements a distributed scheduler. This would allow the distributed scheduler to schedule UE 110 for uplink data transmission on each carrier. UE 110 may also send a separate resource request for each carrier even if Node B 120 implements a joint scheduler. In this case, the joint scheduler may combine the resource requests for different carriers and/or may grant or deny each resource request. The joint scheduler may also grant data rates that may be different from data rates requested by UE 110. For example, the granted data rates may be higher than the requested data rates for some carriers and may be lower than the requested data rates for other carriers. However, the total granted data rate may be less than or equal to the total requested data rate. UE 110 may generate resource requests for the K carriers as described below.

UE 110 may have a maximum transmit power of $P_{max}$ and may use some of the transmit power to send pilot and/or overhead information on each carrier. UE 11.0 may then have an available transmit power of $P_{avail}$ for data transmission on the K carriers. The available transmit power $P_{avail}$ may be expressed as:

$$P_{avail} = P_{max} - \sum_{k=1}^{K} P_{pilot,k} - \sum_{k=1}^{K} P_{oh,k}, \qquad \text{Eq (1)}$$

where $P_{pilot,k}$ is the transmit power for pilot on carrier k, and $P_{oh,k}$ is the transmit power for overhead information on carrier k.

In a first design, UE 110 may uniformly distribute or split the maximum transmit power $P_{max}$ across all K carriers on which UE 110 might be scheduled for data transmission. In this design, the transmit power allocated to each carrier may be expressed as:

$$P_k = \frac{P_{max}}{K} - P_{pilot,k} - P_{oh,k}, \qquad \text{Eq (2)}$$
$$\text{for } k = 1, \ldots, K,$$

where $P_k$ is the allocated transmit power for data for carrier k.

Figure 2A:
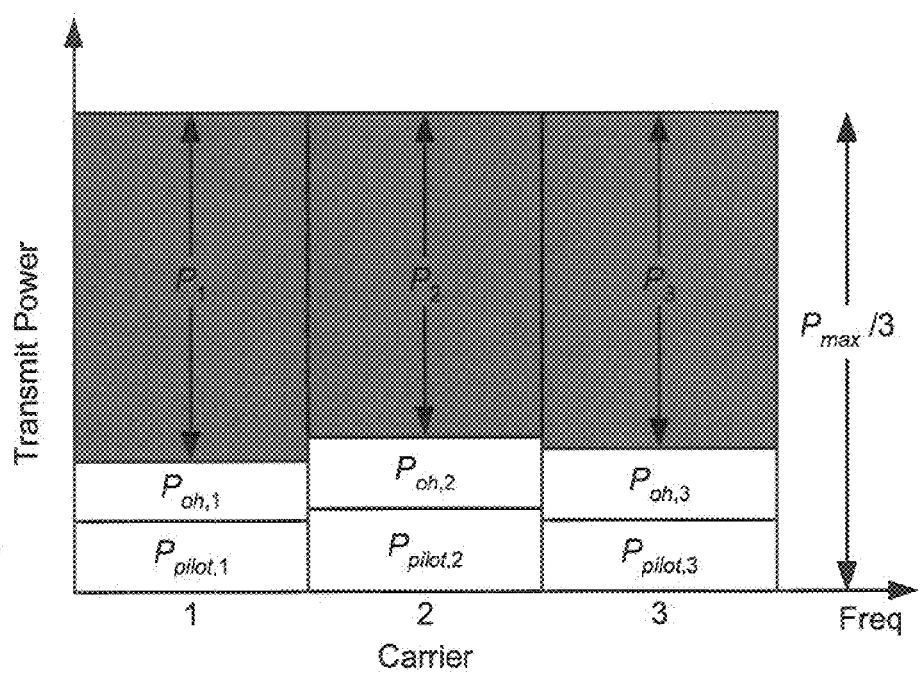
FIGS. 2A, 2B and 2C show transmit power distribution with uniform distribution, greedy filling, and water filling, respectively.

FIG. 2A shows an example of transmit power distribution in accordance with the first design. In this example, three carriers 1, 2 and 3 are available and are allocated transmit powers of $P_1$, $P_2$ and $P_3$, respectively, for data transmission. Although not shown in FIG. 2A, the allocated transmit power for each subcarrier may be limited to $P_{max,k}$, which is the transmit power needed to achieve the maximum data rate supported by the system on carrier k. $P_{max,k}$ may be the same for all carriers or may be different for different carriers.

The available transmit power $P_{avail}$ may also be distributed uniformly across the K carriers. In this case, $P_1 = P_2 = \ldots = P_K = P_{max}/K$.

In a second design, UE 110 may distribute the available transmit power $P_{avail}$ across the K carriers based on greedy filling. In this design, the K carriers may be ordered based on their channel conditions from best to worst. Channel conditions may be quantified as described below. After ordering, carrier 1 is the best carrier, carrier K is the worst carrier, and carrier k is the k-th best carrier. The K carriers may also be ordered based on a static designation.

UE 110 may distribute the available transmit power to the K ordered carriers, one carrier at a time, starting with the best carrier. For a given carrier k selected for transmit power allocation, UE 110 may allocate $P_{max,k}$ to the selected carrier unless the available transmit power is fully used, so that $P_k = \min\{P_{avail}, P_{max,k}\}$. UE 110 may update the available transmit power after allocating transmit power to the selected carrier, as follows:

$$P_{avail} = P_{avail} - P_{max,k}. \qquad \text{Eq (3)}$$

UE 110 may allocate the available transmit power to one carrier at a time until all of the available transmit power is used up or all carriers have been allocated transmit power.

Figure 2B:
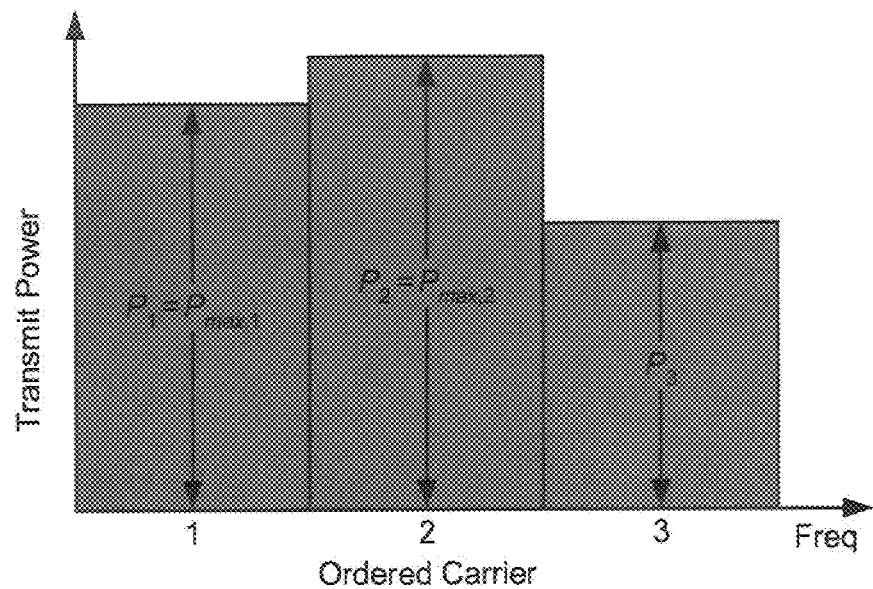

FIG. 2B shows an example of transmit power distribution in accordance with the second design. In this example, three carriers 1, 2 and 3 are available and are ordered from best to worst. Carrier 1 is allocated $P_{max,1}$, carrier 2 is allocated $P_{max,2}$, and carrier 3 is allocated the remaining available transmit power.

In a third design, UE 110 may non-uniformly distribute the available transmit power $P_{avail}$ across the K carriers such that good overall performance can be achieved. In one design, the non-uniform power distribution may be based on water filling. Water filling is analogous to pouring a fixed amount of water into a vessel with an irregular bottom. The amount of water may correspond to the available transmit power, and each carrier may correspond to a point on the bottom of the vessel. The elevation of the bottom at any given point may correspond to the inverse of a signal-to-noise-and-interference ratio (SINR) of a carrier associated with that point. A low elevation may thus correspond to a high SINR, and vice versa. The available transmit power $P_{avail}$ may then be "poured" into the vessel such that lower points in the vessel (which correspond to higher SINRs) are filled first, and higher points in the vessel (which correspond to lower SINRs) are filled later. The power distribution may be dependent on the available transmit power $P_{avail}$ and the depth of the vessel over the bottom surface.

The K carriers may observe different channel and interference conditions and may have different SINRs. The SINR of each carrier may be expressed as:

$$\gamma_k = \frac{P_k \cdot g_k}{N_{0,k}}, \quad \text{Eq (4)}$$

for $k = 1, \ldots, K$, where
  $P_k$ is the transmit power for carrier k,
  $g_k$ is a channel gain for carrier k,
  $N_{0,k}$ is thermal noise and interference on carrier k, and
  $\gamma_k$ is a received SINR for carrier k.

UE 110 may distribute the available transmit power to the K carriers such that the total data rate for the K carriers is maximized. In this case, UE 110 may allocate transmit power to each carrier such that it maximizes the following objective function:

$$J = \sum_{k=1}^{K} f(\gamma_k), \quad \text{Eq (5)}$$

where J is an objective function to maximize, and
  $f(\gamma_k)$ is a function providing a data rate achieved with a received SINR of $\gamma_k$.

Function $f(\gamma_k)$ may be assumed to be monotonically increasing with respect to $\gamma_k$, so that $f'(\gamma_k) > 0$. Function $f(\gamma_k)$ may also be assumed to be concave with respect to $\gamma_k$, so that $f''(\gamma_k) \leq 0$.

UE 110 may distribute the available transmit power across the K carriers with the following constraints:

$$P_k \geq 0, \quad \text{Eq (6)}$$

$$P_k \leq P_{max,k}, \text{ and} \quad \text{Eq (7)}$$

$$\sum_{k=i}^{K} P_k \leq P_{avail}, \quad \text{Eq (8)}$$

where $\dfrac{P_{max,k} \cdot g_k}{N_{0,k}} = \gamma_{max}$ and $P_{max,k} = \dfrac{\gamma_{max} \cdot N_{0,k}}{g_k}$, Eq (9)

$\gamma_{max}$ is a required SINR for the maximum data rate supported by the system, and $P_{max,k}$ is the transmit power needed to achieve an SINR of $\gamma_{max}$ on subcarrier k.

$P_{max,k}$ may also be referred to as the maximum allowed transmit power for carrier k.

Equation (6) indicates that each carrier may be allocated non-negative transmit power. Equation (7) indicates that each carrier should be allocated no more than the transmit power $P_{max,k}$ needed to achieve the maximum data rate supported by the system. Allocating more that $P_{max,k}$ may result in wasted excess power since higher transmit power would result in a received SINR that is higher than $\gamma_{max}$ but would not increase the data rate. Equation (8) indicates that the total transmit power allocated to all K carriers should not exceed the available transmit power.

A Lagrange equation L for the objective function J may be expressed as:

$$L = J - \lambda \cdot \sum_{k=1}^{K} P_k + \sum_{k=1}^{K} \mu_k \cdot P_k - \sum_{k=1}^{K} \beta_k \cdot (\gamma_k - \gamma_{max}), \quad \text{Eq (10)}$$

where $\mu_k$ is a shadow price of $P_k$ and is positive if and only if $P_k = 0$,
  $\beta_k$ is a shadow price of $\gamma_{max}$ and is positive if and only if $\gamma_k = \gamma_{max}$, and
  $\lambda$ is a shadow price of $P_{avail}$.

The shadow prices $\lambda$, $\mu_k$ and $\beta_k$ are non-negative values and are indicative of a change in the objective function J with small deviations from the constraints $P_{avail}$, $P_k = 0$ and $\gamma_k = \gamma_{max}$, respectively.

The objective function J may be maximized by taking the partial derivative of L with respect to $P_k$ and setting the partial derivative to zero, as follows:

$$\frac{\partial f\left(\frac{P_k \cdot g_k}{N_{0,k}}\right)}{\partial P_k} - \lambda + \mu_k - \sum_{k=1}^{K} \frac{\beta_k \cdot g_k}{N_{0,k}} = 0. \quad \text{Eq (11)}$$

When $0 < P_k < P_{max,k}$, the shadow prices become $\mu_k = 0$ and $\beta_k = 0$, and the partial derivative in equation (11) may be expressed as:

$$\frac{\partial f\left(\frac{P_k \cdot g_k}{N_{0,k}}\right)}{\partial P_k} = \lambda, \quad \text{Eq (12)}$$

$$\text{where } \lambda = \frac{\sum_{k=1}^{K} 1\{0 < P_k < P_{max,k}\}}{P_{avail} + \sum_{k=1}^{K} 1\{0 < P_k < P_{max,k}\} \frac{N_{0,k}}{g_k}}. \quad \text{Eq (13)}$$

For equation (13), each carrier k may be assigned a value of 1 if its transmit power is $0 < P_k < P_{max,k}$ or a value of 0 otherwise. The values of all K carriers may be summed to obtain the numerator of equation (13). The value of each carrier may be scaled with $N_{0,k}/g_k$, the scaled values for all K carriers may be summed, and the summed result may be added with $P_{avail}$ to obtain the denominator of equation (13).

Function $f(\gamma_k)$ may map a received SINR to a data rate and may be a constrained capacity function, an unconstrained capacity function, or some other function. In one design, function $f(\gamma_k)$ may be an unconstrained capacity function and may be expressed as:

$$f(\gamma_k) = W \log_2(1+\gamma_k), \quad \text{Eq (14)}$$

where W is the system bandwidth.

By combining equations (12), (13) and (14), the transmit power $P_k$ to allocate to carrier k may be expressed as:

$$P_k = \frac{1}{\lambda - \mu_k + \frac{\beta_k \cdot g_k}{N_{0,k}}} - \frac{N_{0,k}}{g_k}. \quad \text{Eq (15)}$$

For $0 < P_k < P_{max,k}$, with $\mu_k = 0$ and $\beta_k = 0$, equation (15) may be simplified as:

$$P_k = \frac{1}{\lambda} - \frac{N_{0,k}}{g_k}. \quad \text{Eq (16)}$$

In general, $P_k$ may be dependent on the particular function used for $f(\gamma_k)$ and may be determined based on equations (12) and (13).

There is no closed-form solution to distribute the available transmit power to the K carriers with water filling. However, the monotonic and concave characteristics of function $f(\gamma_k)$ and the relationship between $\gamma_k$ and $P_k$ imply that a carrier that is allocated $P_k = P_{max,k}$ should be better than a carrier that is allocated $0 < P_k < P_{max,k}$, which should be better than a carrier that is allocated $P_k = 0$. This observation may be exploited to iteratively distribute the available transmit power to the K carriers.

Figure 3:
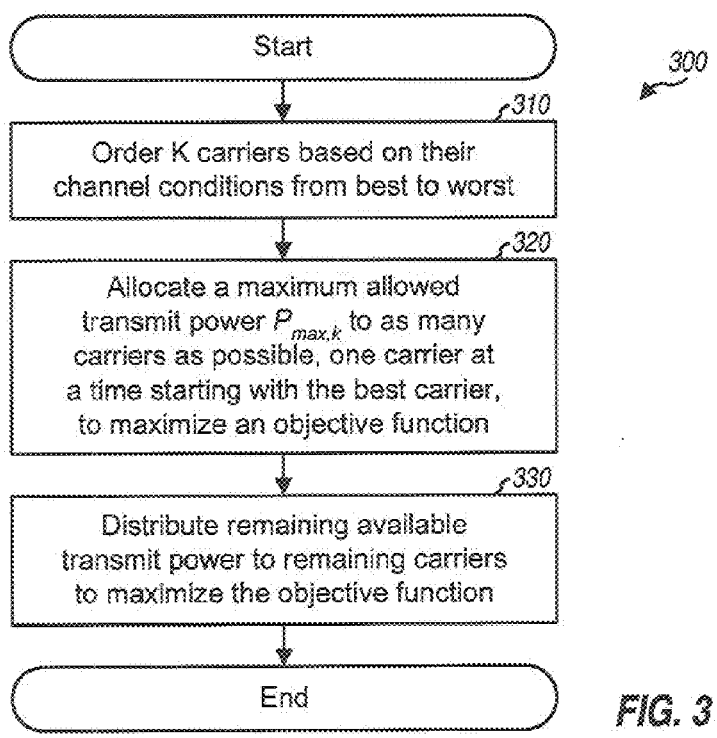
FIGS. 3, 4 and 5 show a process for performing water filling.

FIG. 3 shows a design of a process 300 for performing water filling. Initially, the K carriers may be ordered based on their channel conditions from best to worst (block 310). Channel conditions may be quantified by $g_k/N_{0,k}$, so that the best carrier has the largest $g_k/N_{0,k}$, and the worst carrier has the smallest $g_k/N_{0,k}$. After ordering, carrier 1 is the best carrier, carrier K is the worst carrier, and carrier k is the k-th best carrier.

The maximum allowed transmit power $P_{max,k}$ may then be allocated to as many carriers as possible, one carrier at a time starting with the best carrier, to maximize the objective function J (block 320). Block 320 may allocate zero or more carriers with $P_{max,k}$. The remaining available transmit power may be distributed to the remaining carriers to maximize the objective function (block 330). Block 320 may be referred to as step 1 of water filling, and block 330 may be referred to as step 2 of water filling. Blocks 320 and 330 may each be performed iteratively, as described below.

For iterative water filling, two groups of carriers may be maintained. Group 1 may include carriers that have been allocated $P_k = P_{max,k}$. Group 2 may include carriers that have been allocated $0 < P_k < P_{max,k}$. Groups 1 and 2 may be initialized to contain no carriers, and each carrier may be initialized with $P_k = 0$.

Figure 4:
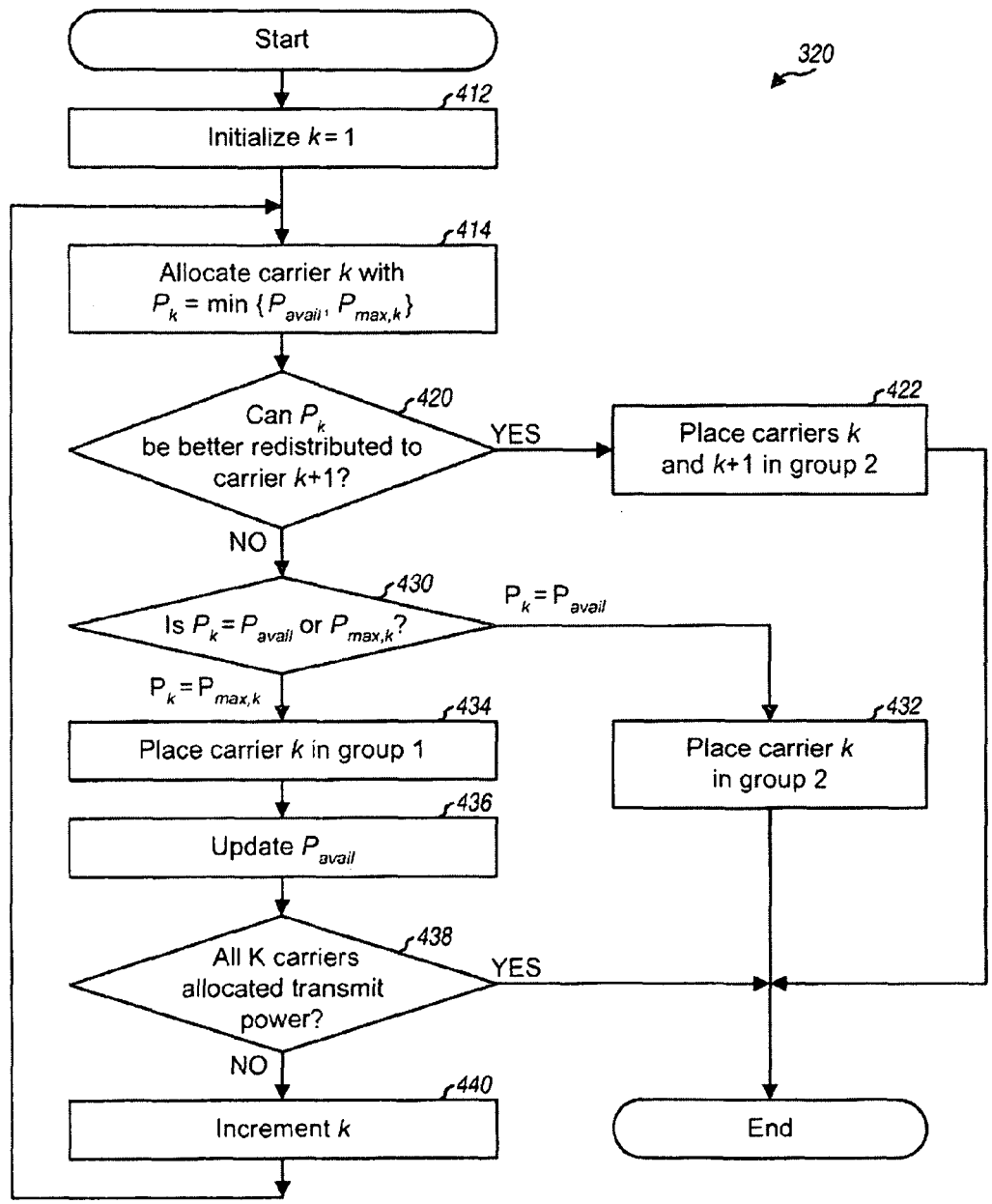

FIG. 4 shows a design of an iterative process for block 320 in FIG. 3. An index k for carrier may be initialized to 1 (block 412). Carrier k may be allocated as much transmit power as possible, with the allocated transmit power $P_k$ being limited by either $P_{avail}$ or $P_{max,k}$ (block 414). A determination may then be made whether some of the allocated transmit power $P_k$ for carrier k can be better redistributed to the next worse carrier k+1 (step 420). This determination may be made based on the following check:

$$\left.\frac{\partial f(\gamma_k)}{\partial P_k}\right|_{P_k} < \left.\frac{\partial f(\gamma_{k+1})}{\partial P_{k+1}}\right|_{P_{k+1}=0}. \quad \text{Eq (17)}$$

Equation (17) compares the partial derivative of $f(\gamma_k)$ with $P_k$ allocated to carrier k against the partial derivative of $f(\gamma_{k+1})$ with no transmit power allocated to the next worse carrier k+1. If equation (17) holds and the answer is 'Yes' for block 420, then carriers k and k+1 may be placed in group 2 (block 422), and the process for block 320 may terminate. Otherwise, if equation (17) does not hold and the answer is 'No' for block 420, then a determination may be made whether the allocated transmit power $P_k$ for carrier k is equal to $P_{avail}$ or $P_{max,k}$ (block 430). If $P_k$ is equal to $P_{avail}$, then carrier k may be placed in group 2 (block 432), and the process for block 320 may terminate.

Otherwise, if $P_k$ is equal to $P_{max,k}$, then carrier k may be placed in group 1 (block 434). The available transmit power may then be updated as $P_{avail} = P_{avail} - P_k$ (block 436). If all K carriers have been allocated transmit power, as determined in block 438, then the process for block 320 may terminate. Otherwise, index k may be incremented (block 440), and the process may return to block 414.

The process for block 320 in FIG. 4 may provide group 1 containing zero or more carriers that have been allocated $P_{max,k}$ and group 2 containing zero or more carriers that have been allocated less than $P_{max,k}$. Block 330 may be performed if the process for block 320 terminates after block 422 in FIG. 4 and may be skipped if the process for block 320 terminates after block 432 or 438 in FIG. 4.

Figure 5:
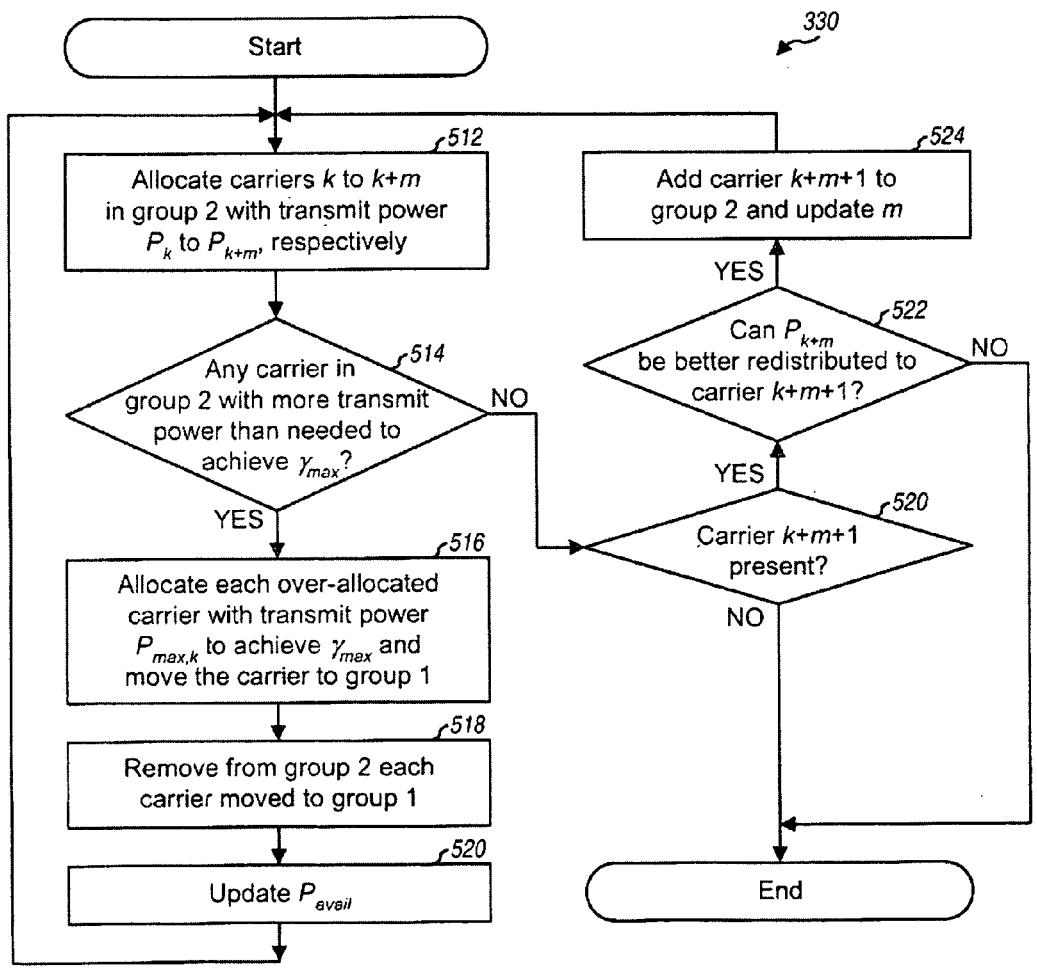

FIG. 5 shows a design of an iterative process for block 330 in FIG. 3. Group 2 may be assumed to include carriers k, k+1, ..., k+m, where k may be less than K, and m may be 0 or larger. Carriers k to k+m in group 2 may be allocated transmit power $P_k$ to $P_{k+m}$ with the available transmit power $P_{avail}$ (block 512). For block 512, $\lambda$ may be computed for the m+1 carriers in group 2, e.g., as shown in equation (13). The transmit power to allocate to each carrier in group 2 may then be computed, e.g., as shown in equation (16).

A determination may then be made whether any carrier within group 2 is allocated more transmit power than needed to achieve $\gamma_{max}$ (block 514). If the answer is 'Yes', then each over-allocated carrier may be allocated enough transmit power to achieve $\gamma_{max}$ and may be moved to group 1 (block 516). Group 2 may also be updated by removing each carrier that has been moved to group 1 (block 518). The available transmit power may be updated by subtracting the transmit power allocated to each carrier moved to group 1 (block 520). The process may then return to block 512 to repeat the transmit power distribution for the remaining members in group 2.

Otherwise, if no carriers are allocated more than the transmit power to achieve $\gamma_{max}$ and the answer is 'No' for block 514, then a determination may be made whether there is a next worse carrier k+n+1 not yet included in group 2 (block 520). If the answer is 'No', then the process for block 330 may terminate. Otherwise, if the answer is 'Yes', then a determination may be made whether some of the allocated transmit power $P_{k+m}$ for the worst carrier k+m in group 2 can be better redistributed to the next worse carrier k+m+1 (step 522). This determination may be made based on the following check:

$$\left.\frac{\partial f(\gamma_{k+m})}{\partial P_{k+m}}\right|_{P_{k+m}} < \left.\frac{\partial f(\gamma_{k+m+1})}{\partial P_{k+m+1}}\right|_{P_{k+m+1}=0}. \quad \text{Eq (18)}$$

Equation (18) compares the partial derivative of $f(\gamma_{k+m})$ with $P_{k+m}$ allocated to the worst carrier k+m in group 2 against the partial derivative of $f(\gamma_{k+m+1})$ with no transmit power allocated to the next worse carrier k+m+1. If equation (18) holds and the answer is 'Yes' for block 522, then carrier k+m+1 may be added to group 2 (block 524), and the process may return to block 512 to repeat the transmit power distribution with carriers k to k+m+1 in group 2. Otherwise, if equation (18) does not hold and the answer is 'No' for block 522, then the process for block 330 may terminate.

One or more iterations may be performed for block 320 and/or block 330 to distribute the available transmit power to the K carriers. The result of the water filling is one or more carriers being allocated transmit power such that the objective function J is maximized. There may be some unused transmit power if UE 110 has ample power headroom to allocate each carrier with the maximum allowed transmit power to achieve $\gamma_{max}$.

FIGS. 3, 4 and 5 show one design of performing water filling, to distribute the available transmit power to the K carriers. Water filling may also be performed in other manners. For example, block 320 in FIG. 3 may be omitted, and block 330 may be performed with group 2 initially including carriers 1 and 2.

Figure 2C:
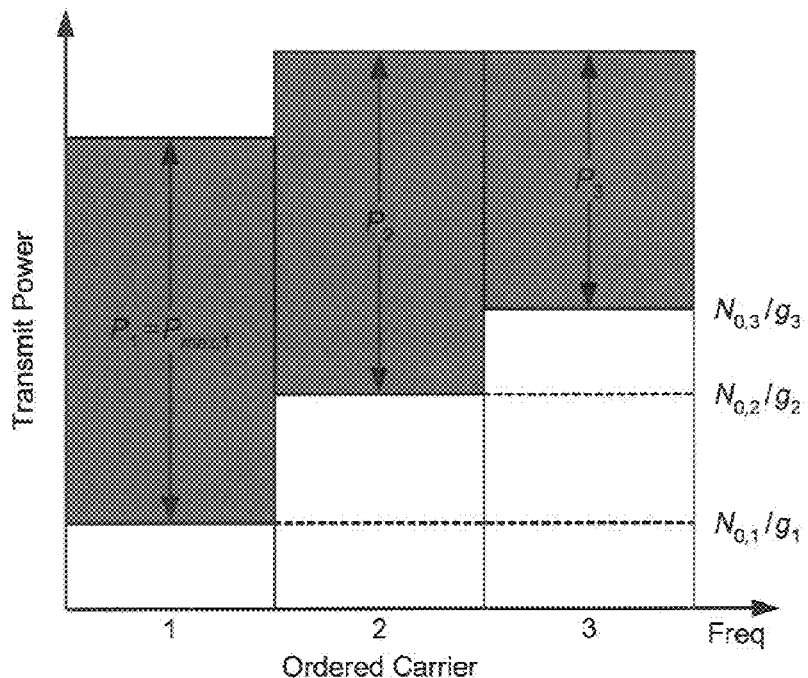

FIG. 2C shows an example of transmit power distribution in accordance with the third design for water filling. In this example, three carriers 1, 2 and 3 are available and ordered from best to worst. Carrier 1 is allocated $P_1 = P_{max,1}$, carrier 2 is allocated $P_2 < P_{max,2}$, and carrier 3 is allocated $P_3 < P_{max,3}$, where $P_2$ and $P_3$ may be determined by equations (13) and (16).

As shown in equations (15) and (16), UE 110 may determine the transmit power $P_k$ to allocate to each carrier k based on the channel gain $g_k$ and the noise and interference $N_{0,k}$ for that carrier. However, UE 110 may not know the channel gain $g_k$ and the noise and interference $N_{0,k}$. In one design, UE 110 may determine the allocated transmit power $P_k$ for each carrier k based on the transmit power $P_{pilot,k}$ for pilot on carrier k. The transmit power for pilot may be adjusted with a power control loop to achieve a target SINR at Node B 120. The transmit power $P_k$ for traffic data may then be set higher than the transmit power for pilot by a selected T2P and may be expressed as:

$$P_k = P_{pilot,k} \cdot T2P_k, \quad \text{Eq (19)}$$

where $T2P_k$ is the T2P for carrier k.

Pilot may be considered to be equivalent to a data rate of $R_{pilot}$. A data rate of $R_{data}$ may be achieved for traffic data with the selected T2P. The equivalent data rate for pilot may then be expressed as:

$$R_{pilot} = \frac{R_{data}}{T2P_k}. \quad \text{Eq (20)}$$

Equation (20) may be more accurate for a low data rate for traffic data $R_{data}$ and may be less accurate for a high data rate for traffic data.

The power control loop may set a target SINR for pilot to within a narrow range regardless of the data rate for traffic data. In this case, the scaling in equation (20) may be insensitive to the data rate of traffic data. The equivalent pilot data rate $R_{pilot}$ may lie in a linear region of function $f(\gamma_k)$. For the unconstrained capacity function shown in equation (14), the equivalent data rate for pilot may be expressed as:

$$R_{pilot} = W \log_2\left(1 + \frac{P_{pilot,k} \cdot g_k}{N_{0,k}}\right) \cong W \frac{P_{pilot,k} \cdot g_k}{N_{0,k}}. \quad \text{Eq (21)}$$

The ratio of the channel gain $g_k$ to the noise and interference $N_{0,k}$ for each carrier k may then be approximated as:

$$\frac{g_k}{N_{0,k}} \cong \frac{R_{pilot}}{W \cdot P_{pilot,k}}. \quad \text{Eq (22)}$$

The equivalent pilot data rate $R_{pilot}$ may be computed based on a known traffic data rate $R_{data}$ and a known T2P for data transmission on one or more carriers. The ratio $g_k/N_{0,k}$ may then be determined for each carrier k based on the computed $R_{pilot}$, the known system bandwidth W, and the known transmit power $P_{pilot,k}$ used for pilot on carrier k.

The transmit power $P_k$ to allocate to carrier k may then be expressed as:

$$P_k = \frac{1}{\lambda} - \frac{W \cdot P_{pilot,k}}{R_{pilot}}. \quad \text{Eq (23)}$$

Equation (23) assumes that $0 < P_k < P_{mask}$, so that $\mu_k = 0$ and $\beta_k = 0$.

The shadow price $\lambda$ may be appropriated as follows:

$$\lambda = \frac{\sum_{k=1}^{K} 1\{0 < P_k < P_{max,k}\}}{P_{avail} + \sum_{k=1}^{K} 1\{0 < P_k < P_{max,k}\} \frac{W \cdot P_{pilot,k}}{R_{pilot}}}. \quad \text{Eq (24)}$$

Equations (23) and (24) indicate that carriers with better channel conditions (and hence lower transmit power for pilot) generally have larger allocated transmit power $P_k$. This may be the case even if the received SINR is higher for a better carrier at Node B 120.

Various simplifications may be used for iterative water filling. In one design, a linear region with a cutoff T2P may be defined for function $f(\gamma_k)$. The linear region may cover a range of $P_k$ or $\gamma_k$ values (or equivalently, a range of data rates) in which $f(\gamma_k)$ may be approximated with a linear function. For any given iteration in FIG. 4, if the allocated transmit power for carrier k is in the linear region, then the iteration can terminate right away without performing the check in equation (17).

As an example, water filling for a case with two carriers 1 and 2 and all data rates being in a linear region may be performed as follows. Carrier 1 may be allocated as much transmit power as possible. If the allocated transmit power $P_1$ for carrier 1 is limited by $P_{avail}$, then water filling terminates. If $P_1$ is limited by $P_{max,1}$, then carrier 2 may be allocated as much transmit power as possible. The allocated transmit power $P_2$ for carrier 2 may be limited by $P_{avail}$ or $P_{max,2}$.

As another example, water filling for a case with two carriers 1 and 2 and the maximum data rate being in a nonlinear region may be performed as follows. Carrier 1 may be allocated as much transmit power as possible, and $P_1$ may be limited by $P_{max,1}$ or $P_{avail}$. The following check may then be made:

$$\left.\frac{\partial f(\gamma_1)}{\partial P_1}\right|_{P_1} > \left.\frac{\partial f(\gamma_2)}{\partial P_2}\right|_{P_2=0}. \qquad \text{Eq (25)}$$

If equation (25) holds and $P_1$ is limited by $P_{avail}$, then water filling terminates. If equation (25) does not hold, then carriers 1 and 2 may be placed in group 2 and may be allocated transmit powers $P_1$ and $P_2$, respectively. A determination may then be made whether any carrier is allocated more transmit power than needed to achieve $\gamma_{max}$. If so, then carrier 1 may be allocated enough transmit power to achieve $\gamma_{max}$, and carrier 2 may be allocated as much of the remaining transmit power as possible. $P_2$ for carrier 2 may be limited by $P_{avail}$ or $P_{max,2}$.

To simplify the computation for water filling, the partial derivative $$\frac{\partial f(\gamma_k)}{\partial P_k}$$

for different values of $P_k$ may be approximated with piecewise linear approximation and stored in a look-up table. The partial derivative for each data rate may then be determined readily by accessing the look-up table.

UE 110 may determine the allocated transmit power $P_k$ for each of the K carriers based on uniform distribution, greedy filling, or water filling, as described above. In one design, UE 110 may determine a requested T2P for each carrier k based on the allocated transmit power $P_k$ and the pilot transmit power $P_{pilot,k}$ for carrier k, e.g., as shown in equation (19). UE 110 may generate a resource request for each carrier with non-zero allocated transmit power and may include the requested T2P for the carrier. Node B 120 may schedule UE 110 for data transmission on the uplink based on the reported T2P for each carrier. Node B 120 may also determine a granted T2P for each carrier, which may be equal to, less than, or possibly greater than the requested T2P for the carrier. Node B 120 may send a resource grant for each carrier with a positive granted T2P. UE 110 may then transmit traffic data on each carrier using up to the granted T2P for the carrier. UE 110 may store a table that maps T2P to transport format and may determine a particular transport format or data rate to use for each carrier based on the granted T2P for that carrier.

In general, UE 110 may send any information for each carrier that may be pertinent to Node B 120 to schedule UE 110 for data transmission and to allocate resources to UE 110. The information sent by UE 110 may comprise a T2P, an allocated transmit power $P_k$, an SINR estimate, a data rate, the amount of traffic data to send, etc. The information for each carrier may be sent on a separate resource request. Alternatively, a resource request may carry information for multiple carriers. Node B 120 may grant resources to UE 110 based on the information received from UE 110. The granted resources may be given by the amount of transmit power that UE 110 can use on each carrier, a data rate for each carrier, etc.

If Node B 120 uses a joint scheduler, then the joint scheduler may determine the channel conditions of each carrier for UE 110 and may determine suitable resource grants for all K carriers based on the channel conditions and possibly other factors. For example, the resource grants for UE 110 may be dependent on the data requirements of UE 110, the instantaneous loading conditions at Node B 120, an interference level (e.g., a target rise-over-thermal (ROT)) allowed by Node B 120, etc. If Node B 120 uses a distributed scheduler, then the distributed scheduler may schedule UE 110 for each carrier based on the channel conditions and the resource request for that carrier.

Figures 6, 7:
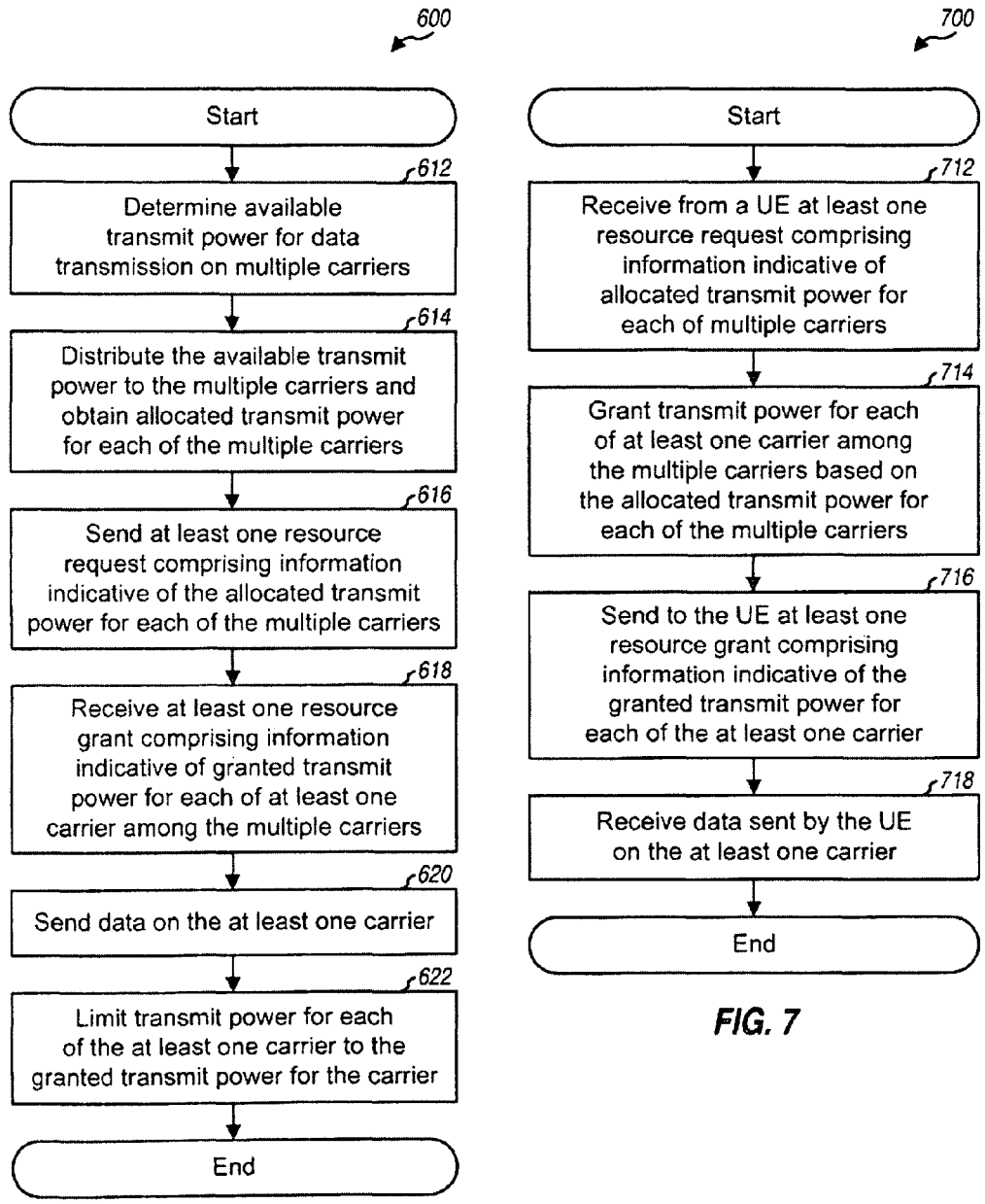
FIG. 6 shows a process for sending resource requests for multiple carriers.
FIG. 7 shows a process for receiving resource requests for multiple carriers.

FIG. 6 shows a design of a process 600 for generating and sending resource requests for multiple carriers. Process 600 may be performed by a UE (as described below) or by some other entity. The UE may determine available transmit power $P_{avail}$ for data transmission on multiple carriers (block 612). The UE may distribute the available transmit power to the multiple carriers to obtain allocated transmit power $P_k$ for each of the multiple carriers (block 614). The UE may send at least one resource request comprising information indicative of the allocated transmit power for each of the multiple carriers (block 616). The UE may send one resource request for each carrier or may send a resource request for more than one carrier. The UE may thereafter receive at least one resource grant comprising information indicative of granted transmit power for each of at least one carrier among the multiple carriers (block 618). The UE may be granted transmit power for all or a subset of the multiple carriers. The UE may send data on the at least one carrier (block 620) and may limit the transmit power for each carrier to the granted transmit power for that carrier (block 622).

In one design of block 614, the UE may distribute the maximum transmit power equally to the multiple carriers and may determine the allocated transmit power for each carrier based on the transmit power distributed to that carrier and the transmit power used for pilot and overhead on the carrier, e.g., as shown in equation (2). The UE may also distribute the available transmit power equally to the multiple carriers. In another design of block 614, the UE may distribute the available transmit power based on greedy filling. In this design, the UE may order the multiple carriers from best to worst based on their channel conditions. The UE may select one carrier at a time to allocate transmit power, starting with the best carrier. The UE may allocate the selected carrier with the maximum allowed transmit power for that carrier, until the available transmit power is fully used.

In yet another design of block 614, the UE may distribute the available transmit power based on water filling. The UE may distribute the available transmit power unevenly to the multiple carriers, with carriers observing better channel conditions being allocated more transmit power. To simplify power distribution, the UE may order the multiple carriers from best to worst based on their channel conditions and may distribute the available transmit power to the multiple carriers based on their order and the channel conditions of the multiple carriers. The UE may first allocate the maximum allowed transmit power to as many carriers as possible, one carrier at a time starting with the best carrier, based on an objective function, e.g., as shown in FIG. 4. The UE may then allocate the remaining available transmit power to remaining ones of the multiple carriers, if any, based on the objective function, e.g., as shown in FIG. 5. The UE may also skip the first part of water filling in FIG. 4 and may just perform the second part of water filling in FIG. 5. The objective function may maximize the sum of data rates for the multiple carriers, e.g., as shown in equation (5).

In one design of the first part of water filling shown in FIG. 4, the UE may select a carrier (e.g., the best carrier not yet selected) to allocate transmit power. The UE may then allocate the selected carrier with the lower of all available transmit power $P_{avail}$ or the maximum allowed transmit power $P_{max,k}$ for the selected carrier. The UE may update the available transmit power to account for the transmit power allocated to the selected carrier. The UE may also determine whether to redistribute the allocated transmit power for the selected carrier to the next worse carrier, e.g., as shown in equation (17). The UE may also perform other steps shown in FIG. 4.

In one design of the second part of water filling shown in FIG. 5, the UE may distribute the available transmit power to at least one carrier among the multiple carriers based on water filling, e.g., as shown in equation (13) and (16). The UE may determine whether to redistribute the allocated transmit power for the worst carrier among the at least one subcarrier to the next worse carrier. If a determination is made to redistribute, then the UE may distribute the available transmit power to the at least one carrier and the next worse carrier. The UE may also perform other steps in FIG. 5.

In one design, the UE may estimate the ratio of channel gain to total noise and interference ($g_k/N_{0,k}$) for each of the multiple carriers. The UE may estimate an equivalent data rate for pilot sent on each carrier based on a data rate for traffic data sent on that carrier and transmit power (or a T2P) for the traffic data, e.g., as shown in equation (20). The UE may then estimate $g_k/N_{0,k}$ for each carrier based on the transmit power for pilot sent on the carrier and the equivalent data rate for pilot, e.g., as shown in equation (22). The UE may distribute the available transmit power to the multiple carriers based on the estimated $g_k/N_{0,k}$ for each carrier, e.g., as shown in equations (23) and (24).

FIG. 7 shows a design of a process 700 for receiving resource requests for multiple carriers. Process 700 may be performed by a Node B (as described below) or by some other entity. The Node B may receive from a UE at least one resource request comprising information indicative of allocated transmit power for each of multiple carriers (block 712). The allocated transmit power for each carrier may be determined by distributing available transmit power at the UE to the multiple carriers using uniform power distribution, greedy filling, water filling, etc. The Node B may grant transmit power for each of at least one carrier among the multiple carriers based on the allocated transmit power for each of the multiple carriers (block 714). The Node B may send to the UE at least one resource grant comprising information indicative of the granted transmit power for each of the at least one carrier (block 716). The Node B may receive data sent by the UE on the at least one carrier (block 718). The UE may limit the transmit power for each carrier to the granted transmit power for that carrier.

In one design of block 714, the Node B may implement a joint scheduler that may grant transmit power for the at least one carrier jointly based on the allocated transmit powers for the multiple carriers. In another design of block 714, the Node B may implement a distributed scheduler that may grant transmit power for each carrier separately based on the allocated transmit power for that carrier.

The techniques described herein may be used for various systems and radio technologies, as mentioned above. The techniques may be used for multi-carrier High-Speed Packet Access (HSPA) in 3GPP. HSPA includes High-Speed Downlink Packet Access (HSDPA) defined in 3GPP Release 5 and later as well as High-Speed Uplink Packet Access (HSUPA) defined in 3GPP Release 6 and later. HSDPA and HSUPA are sets of channels and procedures that enable high-speed packet data transmission on the downlink and uplink, respectively. For HSPA, UE 110 may distribute the available transmit power to multiple carriers and send resource requests for the multiple carriers on an Enhanced Dedicated Channel (E-DCH) Dedicated Physical Control Channel (E-DPCCH).

UE 110 may receive absolute grants for the multiple carriers on an E-DCH Absolute Grant Channel (E-AGCH) and/or relative grants on an E-DCH Relative Grant Channel (E-RGCH). UE 110 may send traffic data on an E-DCH Dedicated Physical Data Channel (E-DPDCH) in accordance with the grants.

Figure 8:
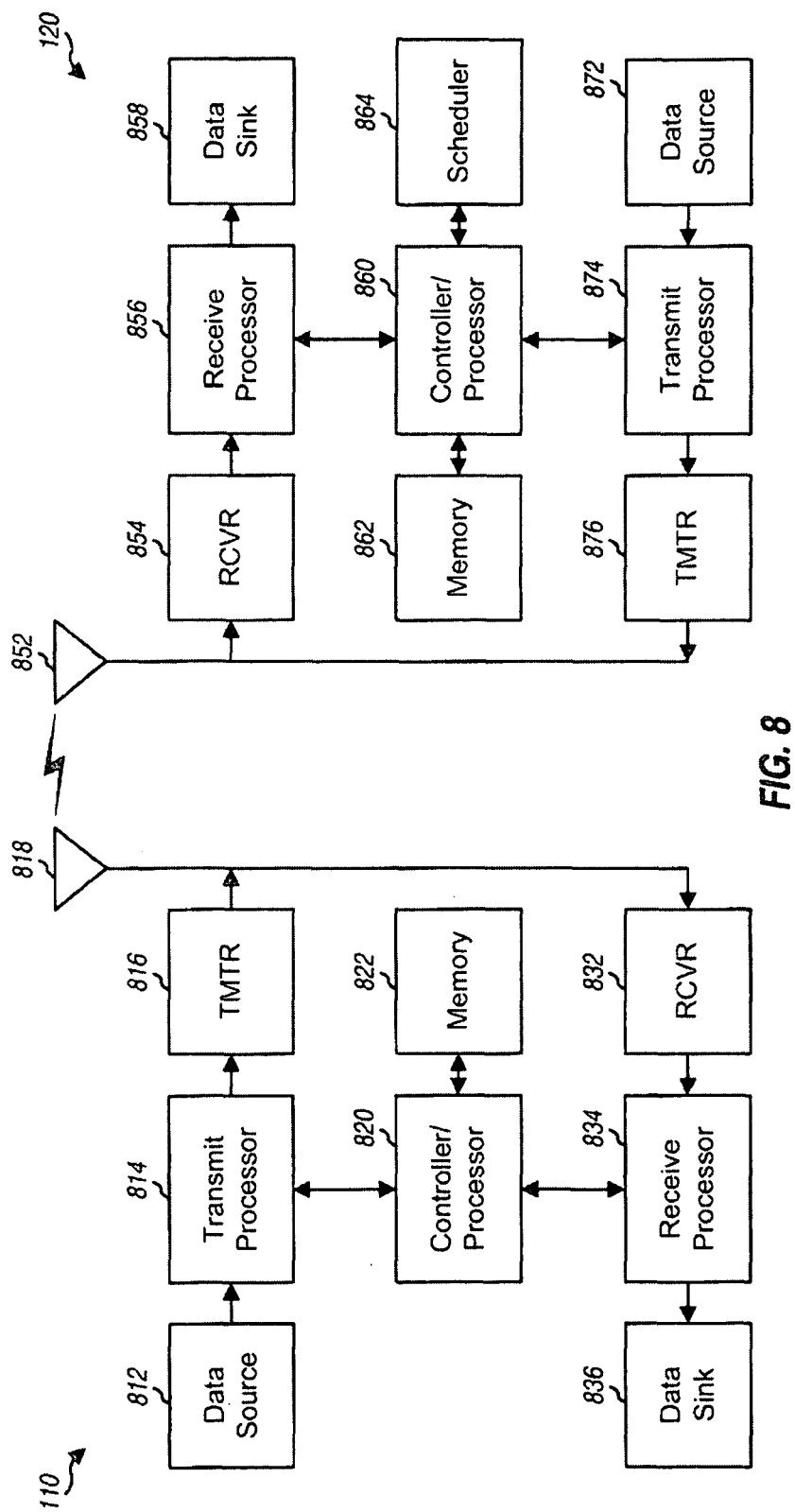
FIG. 8 shows a block diagram of a UE and a Node B.

FIG. 8 shows a block diagram of a design of UE 110 and Node B 120. At UE 110, a transmit processor 814 may receive traffic data from a data source 812 and control information (e.g., resource requests) from a controller/processor 820. Transmit processor 814 may process (e.g., encode and symbol map) the traffic data and control information, performs modulation (e.g., for CDMA, etc.), and provide output samples. A transmitter (TMTR) 816 may condition (e.g., convert to analog, filter, amplify, and upconvert) the output samples and generate an uplink signal, which may be transmitted via an antenna 818.

At Node B 120, an antenna 852 may receive the uplink signals from UE 110 and other UEs and provide a received signal to a receiver (RCVR) 854. Receiver 854 may condition and digitize the received signal and provide input samples. A receive processor 856 may perform demodulation on the input samples (e.g., for CDMA, etc.) and may demodulate and decode the resultant symbols to obtain decoded traffic data and control information sent by UE 110 and other UEs. Receive processor 856 may provide the decoded traffic data to a data sink 858 and the decoded control information to a controller/processor 860.

On the downlink, a transmit processor 874 at Node B 120 may receive traffic data for UEs from a data source 872 and control information (e.g., resource grants) from controller/processor 860. The traffic data and control information may be processed (e.g., encoded, symbol mapped, and modulated) by transmit processor 874 and further conditioned by a transmitter 876 to generate a downlink signal, which may be transmitted via antenna 852. At UE 110, the downlink signal from Node B 120 may be received by antenna 818, conditioned by a receiver 832, and demodulated and decoded by a transmit processor 834.

Controllers/processors 820 and 860 may direct the operation at UE 110 and Node B 120, respectively. Processor 820 and/or other processors and modules at UE 110 may perform or direct process 300 in FIG. 3, process 600 in FIG. 6, and/or other processes for the techniques described herein. Processor 860 and/or other processors and modules at Node B 120 may perform or process 700 in FIG. 7, and/or other processes for the techniques described herein. Memories 822 and 862 store program code and data for UE 110 and Node B 120, respectively. A scheduler 864 may schedule UEs for data transmission on the downlink and/or uplink and may assign resources to the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    determining available transmit power for data transmission on multiple carriers;
    distributing the available transmit power to the multiple carriers to obtain allocated transmit power information for each of the multiple carriers;
    sending at least one resource request comprising first information including the allocated transmit power information for each of the multiple carriers; and
    receiving at least one resource grant comprising second information that establishes an amount of granted transmit power for each of at least one carrier among the multiple carriers.

2. The method of claim 1, further comprising:
    sending data on the at least one carrier; and
    limiting transmit power for each of the at least one carrier to the granted transmit power for the carrier.

3. The method of claim 1, wherein the distributing the available transmit power comprises:
    distributing maximum transmit power equally to the multiple carriers; and
    determining the allocated transmit power for each carrier based on the transmit power distributed to the carrier and transmit power used for pilot and overhead on the carrier.

4. The method of claim 1, wherein the distributing the available transmit power comprises:
    ordering the multiple carriers from best to worst based on channel conditions for the multiple carriers;
    selecting one carrier at a time to allocate transmit power, starting with a best carrier among the multiple carriers; and
    allocating the selected carrier with maximum allowed transmit power for the carrier, until the available transmit power is fully used or all subcarriers have been allocated transmit power.

5. The method of claim 1, wherein the distributing the available transmit power comprises:
    distributing the available transmit power unevenly to the multiple carriers, with carriers observing better channel conditions being allocated more transmit power.

6. The method of claim 1, wherein the distributing the available transmit power comprises:
    ordering the multiple carriers from best to worst based on channel conditions for the multiple carriers; and
    distributing the available transmit power to the multiple carriers based on the order of the multiple carriers and channel conditions of the multiple carriers.

7. The method of claim 6, wherein the distributing the available transmit power to the multiple carriers based on the order of the multiple carriers comprises:

allocating maximum allowed transmit power to as many of the multiple carriers as possible, one carrier at a time starting with a best carrier, based on an objective function; and allocating remaining available transmit power to remaining ones of the multiple carriers, if any, based on the objective function.

8. The method of claim 7, wherein the objective function maximizes a sum of data rates for the multiple carriers.

9. The method of claim 1, wherein the distributing the available transmit power comprises:

selecting a carrier among the multiple carriers to allocate transmit power;

allocating the selected carrier with a lower of all available transmit power or maximum allowed transmit power for the selected carrier; and updating the available transmit power to account for the transmit power allocated to the selected carrier.

10. The method of claim 9, wherein the distributing the available transmit power further comprises determining whether to redistribute the allocated transmit power for the selected carrier to a next worse carrier.

11. The method of claim 1, wherein the distributing the available transmit power comprises:

distributing the available transmit power to at least one carrier among the multiple carriers based on water filling;

determining whether to redistribute allocated transmit power for a worst carrier among the at least one subcarrier to a next worse carrier; and distributing the available transmit power to the at least one carrier and the next worse carrier if a determination is made to redistribute.

12. The method of claim 1, wherein the distributing the available transmit power comprises:

estimating a ratio of channel gain to total noise and interference for each of the multiple carriers; and distributing the available transmit power to the multiple carriers based on the ratio of the channel gain to the total noise and interference for each carrier.

13. The method of claim 12, wherein the distributing the available transmit power comprises:

estimating an equivalent data rate for pilot sent on each carrier based on a data rate for traffic data sent on the carrier and transmit power for the traffic data; and estimating the ratio of the channel gain to the total noise and interference for each carrier based on transmit power for the pilot sent on the carrier and the equivalent data rate for the pilot.

14. The method of claim 1, wherein the first information includes a power ratio that is a ratio of a traffic data transmit power to a pilot transmit power for each of at least one carrier among the multiple carriers.

15. An apparatus for wireless communication, comprising:

at least one processor configured to determine available transmit power for data transmission on multiple carriers, to distribute the available transmit power to the multiple carriers to obtain allocated transmit power information for each of the multiple carriers, to send at least one resource request comprising first information including the allocated transmit power information for each of the multiple carriers, and to receive at least one resource grant comprising second information that establishes an amount of granted transmit power for each of at least one carrier among the multiple carriers.

16. The apparatus of claim 15, wherein the at least one processor is configured to send data on the at least one carrier, and to limit transmit power for each of the at least one carrier to the granted transmit power for the carrier.

17. The apparatus of claim 15, wherein the at least one processor is configured to distribute maximum transmit power equally to the multiple carriers and to determine the allocated transmit power for each carrier based on the transmit power distributed to the carrier and transmit power used for pilot and overhead on the carrier.

18. The apparatus of claim 15, wherein the at least one processor is configured to order the multiple carriers from best to worst based on channel conditions for the multiple carriers, and to distribute the available transmit power unevenly to the multiple carriers based on the order of the multiple carriers, with carriers observing better channel conditions being allocated more transmit power.

19. The apparatus of claim 15, wherein the at least one processor is configured to select a carrier among the multiple carriers to allocate transmit power, to allocate the selected carrier with a lower of all available transmit power or maximum allowed transmit power for the selected carrier, and to update the available transmit power to account for the transmit power allocated to the selected carrier.

20. The apparatus of claim 15, wherein the at least one processor is configured to distribute the available transmit power to at least one carrier among the multiple carriers based on water filling, to determine whether to redistribute allocated transmit power for a worst carrier among the at least one subcarrier to a next worse carrier, and to distribute the available transmit power to the at least one carrier and the next worse carrier if a determination is made to redistribute.

21. An apparatus for wireless communication, comprising:

means for determining available transmit power for data transmission on multiple carriers;

means for distributing the available transmit power to the multiple carriers to obtain allocated transmit power information for each of the multiple carriers;

means for sending at least one resource request comprising first information including the allocated transmit power for each of the multiple carriers; and means for receiving at least one resource grant comprising second information that establishes an amount of granted transmit power for each of at least one carrier among the multiple carriers.

22. The apparatus of claim 21, further comprising:

means for sending data on the at least one carrier; and means for limiting transmit power for each of the at least one carrier to the granted transmit power for the carrier.

23. The apparatus of claim 21, wherein the means for distributing the available transmit power comprises:

means for distributing maximum transmit power equally to the multiple carriers; and means for determining the allocated transmit power for each carrier based on the transmit power distributed to the carrier and transmit power used for pilot and overhead on the carrier.

24. The apparatus of claim 21, wherein the means for distributing the available transmit power comprises:

means for ordering the multiple carriers from best to worst based on channel conditions for the multiple carriers; and means for distributing the available transmit power unevenly to the multiple carriers based on the order of the multiple carriers, with carriers observing better channel conditions being allocated more transmit power.

25. The apparatus of claim 21, wherein the means for distributing the available transmit power comprises:

means for selecting a carrier among the multiple carriers to allocate transmit power;
means for allocating the selected carrier with a lower of all available transmit power or maximum allowed transmit power for the selected carrier; and
means for updating the available transmit power to account for the transmit power allocated to the selected carrier.

26. The apparatus of claim 21, wherein the means for distributing the available transmit power comprises:
means for distributing the available transmit power to at least one carrier among the multiple carriers based on water filling;
means for determining whether to redistribute allocated transmit power for a worst carrier among the at least one subcarrier to a next worse carrier; and
means for distributing the available transmit power to the at least one carrier and the next worse carrier if a determination is made to redistribute.

27. A computer program product, comprising:
a non-transitory computer-readable medium comprising:
code for causing at least one computer to determine available transmit power for data transmission on multiple carriers;
code for causing the at least one computer to distribute the available transmit power to the multiple carriers to obtain allocated transmit power information for each of the multiple carriers;
code for causing the at least one computer to send at least one resource request comprising first information including the allocated transmit power information for each of the multiple carriers; and
code for causing the at least one computer to receive at least one resource grant comprising second information that establishes an amount of granted transmit power for each of at least one carrier among the multiple carriers.

28. A method for wireless communication, comprising:
receiving from a user equipment (UE) at least one resource request comprising first information including allocated transmit power information for each of multiple carriers, the allocated transmit power for each carrier being determined by distributing available transmit power at the UE to the multiple carriers;
granting to the UE transmit power for each of at least one carrier among the multiple carriers based on the allocated transmit power for each of the multiple carriers; and
sending to the UE at least one resource grant comprising second information that establishes an amount of the granted transmit power for each of the at least one carrier.

29. The method of claim 28, wherein the granting to the UE transmit power for each of the at least one carrier comprises granting transmit power for the at least one carrier jointly based on allocated transmit powers for the multiple carriers.

30. The method of claim 28, wherein the granting to the UE transmit power for each of the at least one carrier comprises granting transmit power for each carrier separately based on the allocated transmit power for the carrier.

31. The method of claim 28, wherein the first information includes a power ratio that is a ratio of a traffic data transmit power to a pilot transmit power for each of at least one carrier among the multiple carriers.

32. An apparatus for wireless communication, comprising:
at least one processor configured to receive from a user equipment (UE) at least one resource request comprising first information including allocated transmit power information for each of multiple carriers, the allocated transmit power for each carrier being determined by distributing available transmit power at the UE to the multiple carriers, to grant to the UE transmit power for each of at least one carrier among the multiple carriers based on the allocated transmit power for each of the multiple carriers, and to send to the UE at least one resource grant comprising second information that establishes an amount of the granted transmit power for each of the at least one carrier.

33. The apparatus of claim 32, wherein the at least one processor is configured to grant transmit power for the at least one carrier jointly based on allocated transmit powers for the multiple carriers.

34. The apparatus of claim 32, wherein the at least one processor is configured to grant transmit power for each carrier separately based on the allocated transmit power for the carrier.

35. A method for wireless communication, comprising:
determining available transmit power for data transmission on multiple carriers;
distributing the available transmit power to the multiple carriers to obtain allocated transmit power for each of the multiple carriers, comprising:
estimating a ratio of channel gain to total noise and interference for each of the multiple carriers,
estimating an equivalent data rate for pilot sent on each carrier based on a data rate for traffic data sent on the carrier and transmit power for the traffic data, and
estimating the ratio of the channel gain to the total noise and interference for each carrier based on transmit power for the pilot sent on the carrier and the equivalent data rate for the pilot,
distributing the available transmit power to the multiple carriers based on the ratio of the channel gain to the total noise and interference for each carrier; and
sending at least one resource request comprising information indicative of the allocated transmit power for each of the multiple carriers.

36. An apparatus for wireless communication, comprising:
means for receiving from a user equipment (UE) at least one resource request comprising first information including allocated transmit power information for each of multiple carriers, the allocated transmit power for each carrier being determined by distributing available transmit power at the UE to the multiple carriers;
means for granting to the UE transmit power for each of at least one carrier among the multiple carriers based on the allocated transmit power for each of the multiple carriers; and
means sending to the UE at least one resource grant comprising second information that establishes an amount of the granted transmit power for each of the at least one carrier.

37. The apparatus of claim 36, wherein the means for granting is further configured to grant the transmit power for the at least one carrier jointly based on allocated transmit powers for the multiple carriers.

38. The apparatus of claim 36, wherein the means for granting is further configured to grant the transmit power for each carrier separately based on the allocated transmit power for the carrier.

39. A computer program product, comprising:
a non-transitory computer-readable medium comprising:
code for causing at least one computer to receive from a user equipment (UE) at least one resource request comprising first information including allocated transmit power information for each of multiple carriers, the allocated transmit power for each carrier being determined by distributing available transmit power at the UE to the multiple carriers;

code for causing at least one computer to grant to the UE transmit power for each of at least one carrier among the multiple carriers based on the allocated transmit power for each of the multiple carriers; and code for causing at least one computer to send to the UE at least one resource grant comprising second information that establishes an amount of the granted transmit power for each of the at least one carrier.

40. The computer program product of claim 39, wherein the code for causing the at least one computer to grant is further configured to grant the transmit power for the at least one carrier jointly based on allocated transmit powers for the multiple carriers.

41. The computer program product of claim 39, wherein the code for causing the at least one computer to grant is further configured to grant the transmit power for each carrier separately based on the allocated transmit power for the carrier.

* * * * *